(12) United States Patent
Mydlack et al.

(10) Patent No.: US 6,644,948 B2
(45) Date of Patent: Nov. 11, 2003

(54) MOLD-HALF

(75) Inventors: Thomas L. Mydlack, Rochester, MA (US); Mark Roger Verronneau, Acushnet, MA (US)

(73) Assignee: Acushnet Company, Fairhaven, MA (US)

(*) Notice: Subject to any disclaimer, the term of this patent is extended or adjusted under 35 U.S.C. 154(b) by 221 days.

(21) Appl. No.: 09/881,733

(22) Filed: Jun. 18, 2001

(65) Prior Publication Data

US 2002/0192321 A1 Dec. 19, 2002

(51) Int. Cl.[7] .................... B29C 33/10; B29C 70/70
(52) U.S. Cl. .................. 425/116; 425/215; 425/812
(58) Field of Search .................. 425/215, 812, 425/116, 120, 125, 129.1

(56) References Cited

U.S. PATENT DOCUMENTS

| | | | | |
|---|---|---|---|---|
| 548,546 A | * | 10/1895 | Hillman | 425/395 |
| 1,157,420 A | * | 10/1915 | Roberts | 425/233 |
| 1,515,125 A | * | 11/1924 | Landstra | 425/215 |
| 2,361,348 A | * | 10/1944 | Dickson et al | 264/278 |
| RE23,176 E | * | 11/1949 | Milner | 425/408 |
| 2,633,603 A | * | 4/1953 | Huse | 425/215 |
| 2,733,494 A | * | 2/1956 | Bryer et al | 425/84 |
| 2,787,024 A | * | 4/1957 | Smith | 264/275 |
| 3,112,521 A | * | 12/1963 | Ward | 425/126.1 |
| 4,508,309 A | | 4/1985 | Brown | 249/81 |
| 4,558,499 A | | 12/1985 | Brown | 29/157.3 R |
| 4,562,990 A | * | 1/1986 | Rose | 249/141 |
| 5,006,297 A | * | 4/1991 | Brown et al. | 264/234 |
| 5,725,891 A | | 3/1998 | Reid, Jr. | 425/407 |
| 5,795,529 A | | 8/1998 | Reid, Jr. | 264/293 |
| 6,096,255 A | | 8/2000 | Brown et al. | 264/248 |
| 6,171,091 B1 | * | 1/2001 | Bettencourt | 425/116 |
| 6,290,797 B1 | | 9/2001 | Gosetti et al. | 156/228 |
| 6,328,921 B1 | | 12/2001 | Marshall et al. | 264/279.1 |

FOREIGN PATENT DOCUMENTS

| | | | | |
|---|---|---|---|---|
| JP | 59031135 A | * | 2/1984 | B29H/03/00 |
| JP | 2000/202065 A | * | 7/2000 | A63B/45/00 |

* cited by examiner

*Primary Examiner*—Robert Davis
(74) *Attorney, Agent, or Firm*—Swidler Berlin Shereff Friedman, LLP

(57) ABSTRACT

The present invention is an improved mold-half that is useful in forming golf ball covers or other layers. The mold-half is particularly useful for compression molding a thin polyurethane cover over a golf ball formed from a plurality of inner layers. The mold-half includes a cavity and a land area surrounding the cavity. The land area has an upper surface and at least one vent in fluid connection with the cavity via a chamber formed by a recessed circumferential ledge adjacent the cavity. The ledge controls the flow of excess layer material from the cavity to each vent.

25 Claims, 8 Drawing Sheets

MOLD-HALF

FIELD OF THE INVENTION

This invention generally relates to the manufacture of golf balls, and more particularly, to a mold-half for molding various layers on golf balls.

BACKGROUND OF THE INVENTION

Modern day golf balls can be generally classified as one-piece, solid and wound. Solid balls can be one-piece or two or more piece constructions. One-piece solid balls are injection or compression molded from a homogeneous mass of material with a dimple pattern molded thereon. These are inexpensive and very durable, but do not provide great distance because of their lower compression. They tend to have a soft feel when struck with the club face.

Two piece solid balls are made by molding a cover about a solid core. These are one of the most popular types of balls in use today. These balls can have a hard "cutproof" cover which goes a greater distance, and generally have lower spin rates. Three-piece solid balls may be made by molding a cover around a solid core comprising a solid center with a mantle layer molded about the outside of the center.

Wound balls are made by molding a cover about a wound core. A center is typically made of rubber and can be solid or have a fluid-filled center. The wound core is prepared by winding a lengthy thin thread of elastic material about the center. The wound core is then covered with a durable cover material. Wound balls are generally softer and provide more spin, resulting in increased control over the ball. As a result of their more complex construction, the wound balls generally require a longer time to manufacture and are more expensive to produce than solid balls.

The covers on these golf balls are made from materials, such as synthetic balata ionomer resins, or urethane polymers. A prior art mold-half for use with these materials is shown in FIGS. 1–3. The mold-half 10 comprises a cavity 15, a land area 20 surrounding the cavity 15, a circumferential groove 30 within the land area 20, and a plurality of vents 35 in fluid communication with the circumferential groove 30. The vents 35 and groove 30 are spaced from the cavity. The surface 40 of the cavity 15 is textured with dimple forming projections 45, which produce a dimple pattern on the cover of the golf ball. Additionally, the land area 20 includes an upper surface 50 and a radially outer surface 55. The portion of the land area between the cavity 15 and the groove 30 is designated 20a. The portion of the land area radially outward of the groove is designated 20b. Each vent 35 includes a vent side wall 60. The mold-half 10 further includes a projection 65 extending radially outward from the land area 20.

A pair of mold-halves 10 are clamped together under pressure to form a spherical cavity therein. As the mold-halves 10 are clamped the cavities contain a core or center and material to form hemispherical portions of the cover. The mold-halves 10 are held together until the cover material is cooled and then opened to demold the ball. As this mold is closed, excess cover material between the land areas 20a is squeezed into the groove 30 and flows into vents 35, which convey the material to the exterior of the mold. Notably, the groove 30 is configured to form an alignment ring for a separate process in the manufacture of the golf ball and is not specifically designed to cooperate with the other features of the mold to facilitate compression molding of material. The cavity 15 still contains excess cover material but there is no passageway from the cavity to convey this material. The process is farther complicated by the inability to convey the excess material within the cavity out of the cavity. The increased internal pressure due to the thermal expansion of the molded ball assembly causes this excess material to separate the mold and allows jagged flash to form around the molded cover of the ball.

Consequently, a need exists for an improved mold-half for manufacturing a golf ball cover. The mold-half should minimize the likelihood of mold separation, reduce the number of cracked or defected covers produced, and lower the potential for jagged flash formation around the molded cover or other molded layer of the golf ball.

SUMMARY OF THE INVENTION

The present invention is an improved mold-half that is particularly useful in casting golf ball covers. In particular, the mold-half is useful for molding a thin veneer cover over a golf ball subassembly that includes a plurality of inner layers. The mold-half includes a hemispherical cavity and a land area surrounding the cavity. The land area has an upper surface and at least one vent defined in the upper surface spaced from the cavity. The land area also has a circumferential ledge adjacent the cavity and each vent.

Two mold-halves of the present invention are combined to form a mold. Joining the land areas of a pair of mold-halves creates a spherical cavity for receiving the subassembly. Additionally, a chamber is formed adjacent the cavity by the opposing ledges of the two mold halves, and opposing vent pairs each form a bore for releasing excess material from the chamber. The ledges and vents are operatively configured such that the flow of material is allowed primarily through the bores. Furthermore, the chamber is configured such that the volume of the chamber is sufficient to contain the material during flow from the cavity without allowing the mold-halves to separate.

Generally, the length of the circumferential ledge is between about 0.005 inches and about 0.05 inches and preferably the length of the circumferential ledge is about 0.015 inches. Additionally, the circumferential ledge is recessed from the upper surface of the land area by about 0.001 to about 0.01 inches, more preferably by about 0.005 inches. Further, each vent is spaced from the cavity wall by about 0.01 inches to about 0.02 inches. The preferred length from the cavity wall to each vent is about 0.015 inches. Further still, the depth of each vent is between about 0.025 inches and about 0.08 inches, and the preferred depth of each vent is about 0.03 inches. Typically, each vent has a length of at least between about 0.04 inches and about 0.08 inches with a preferred length of about 0.5 inches.

In one embodiment, the mold-half further includes a projection that extends radially outward along the entire circumference of the land area. The projection is located below the upper surface of the land area. The outer diameter of the projection is about 2.43 inches and the thickness of the projection is about 0.25 inches. An upper surface of the projection is situated about 0.38 inches below the upper surface of the land area.

According to the features of one embodiment, the land area includes a uniformly sloped surface extending between the upper surface of the land area and the upper surface of the projection. In addition, in one embodiment the cavity includes a plurality of projections for forming a plurality of depressions or dimples in the cover. In yet another embodiment, the land area contains a plurality of vents which preferably are spaced uniformly around the circumference of the land area.

The present invention is also directed to a mold for forming a layer of material around a golf ball subassembly. The mold includes a pair of mold-halves, where each mold-half includes a hemispherical cavity, a land area, and a circumferential ledge. The land area surrounds the cavity and includes an upper surface. The circumferential ledge is adjacent the cavity. The upper surface of one land area is configured to mate with the opposing land area and locate a portion of the material within the cavity.

The mold may also include vents extending from the ledge.

DETAILED DESCRIPTION OF THE PREFERRED EMBODIMENTS

Figure 1:
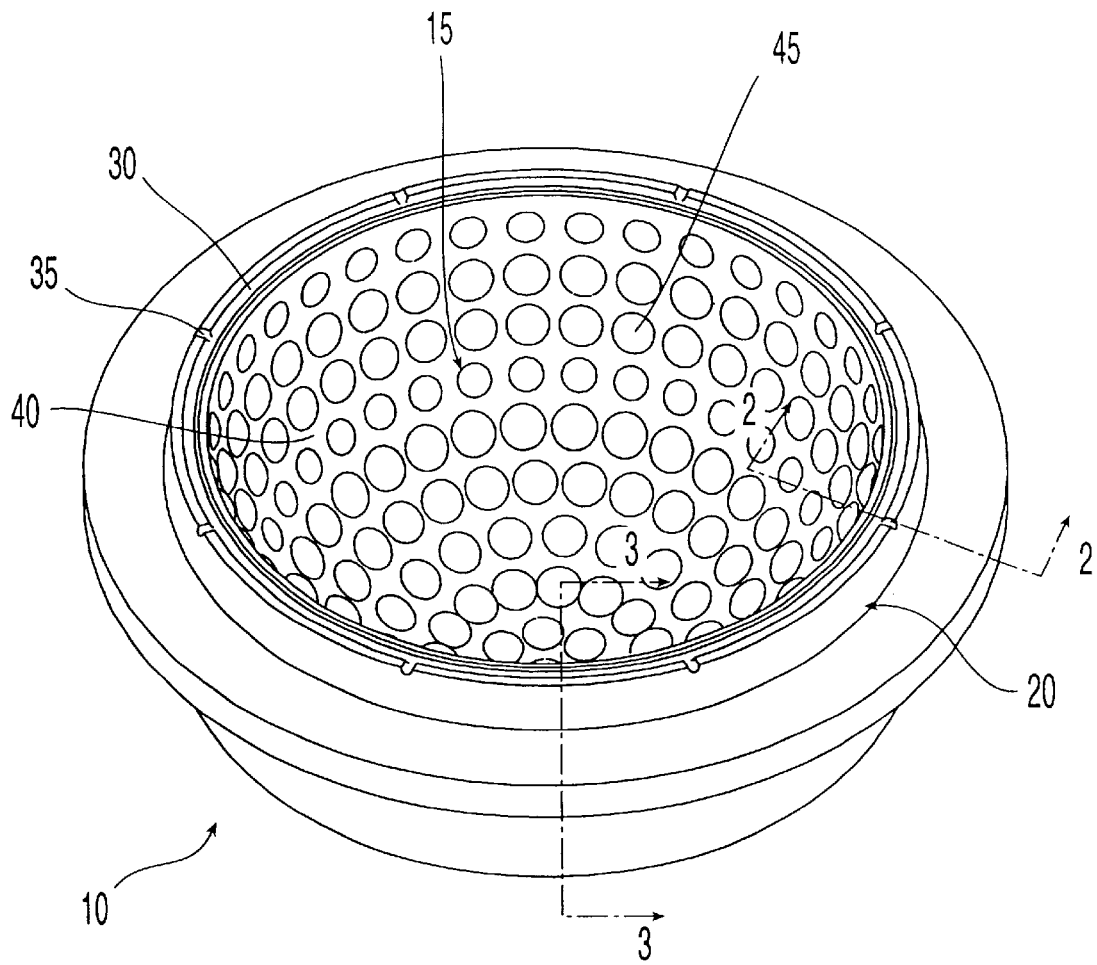
FIG. 1 is a perspective view of a prior art mold-half.
Figure 2:
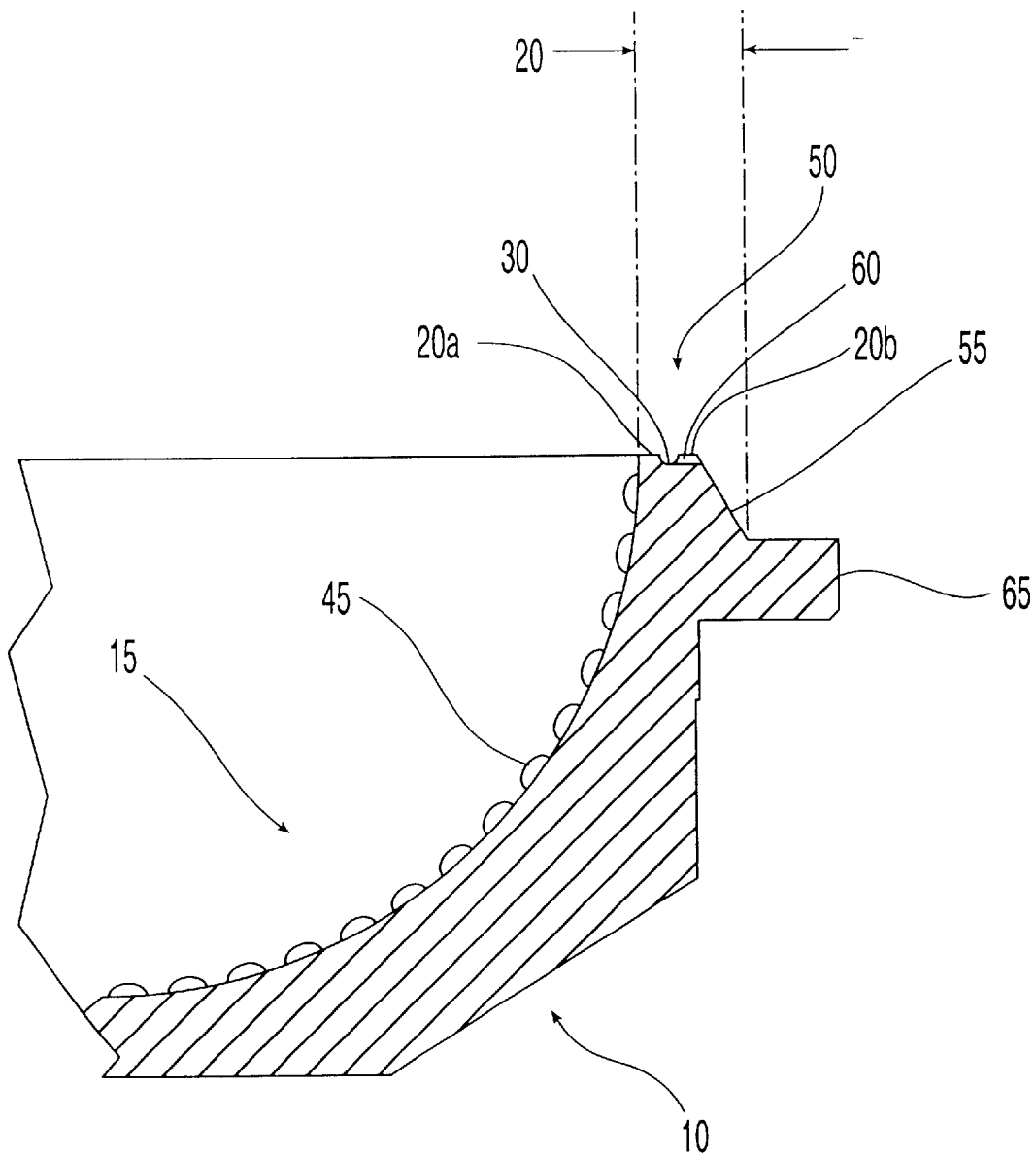
FIG. 2 is an enlarged, partial-sectional view along line 2—2 of the mold-half in FIG. 1 only selected dimple forming projections are shown.
Figure 3:
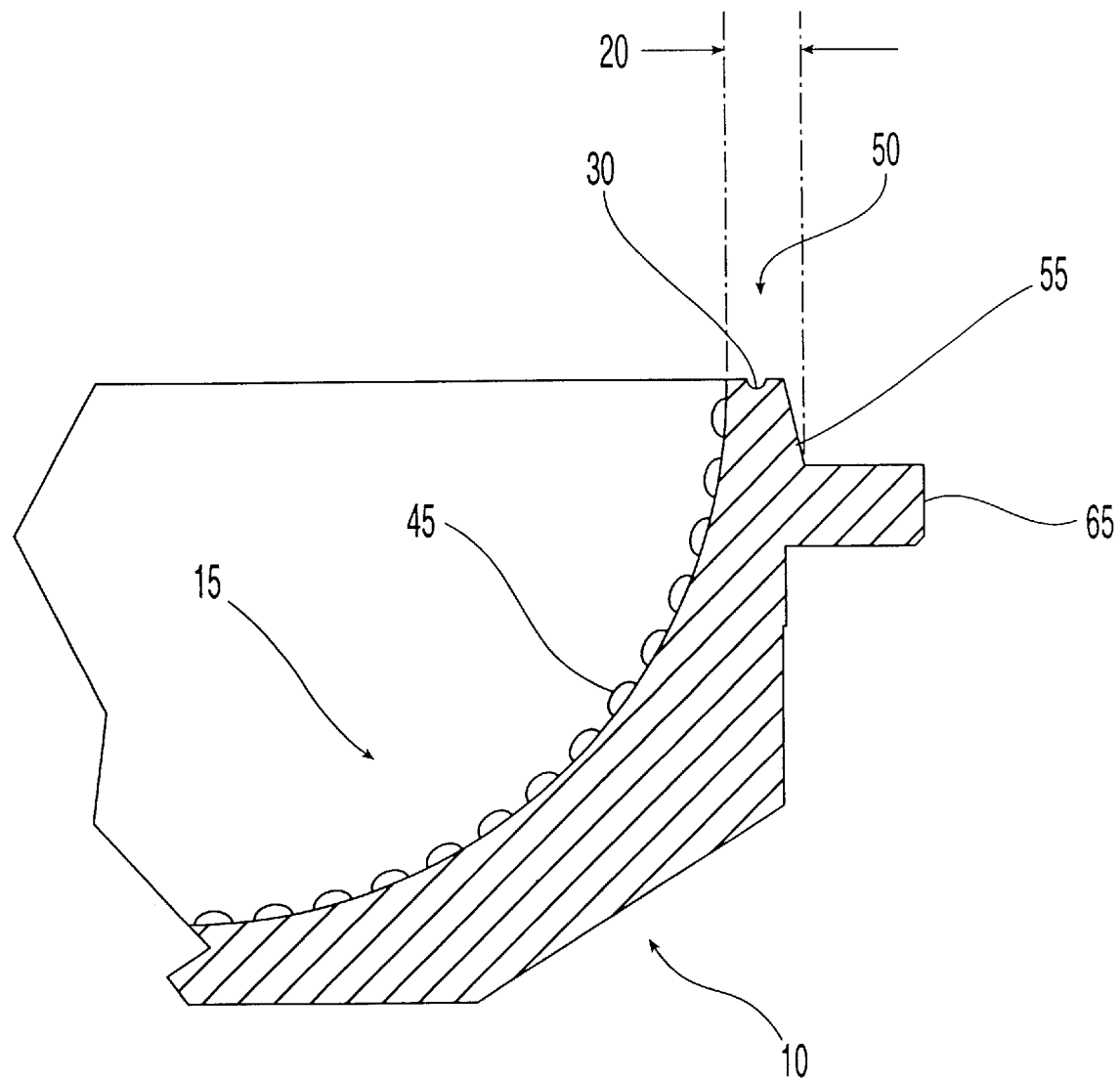
FIG. 3 is an enlarged, partial-sectional view along line 3—3 of the mold-half in FIG. 1 only selected dimple forming projections are shown.
Figure 4:
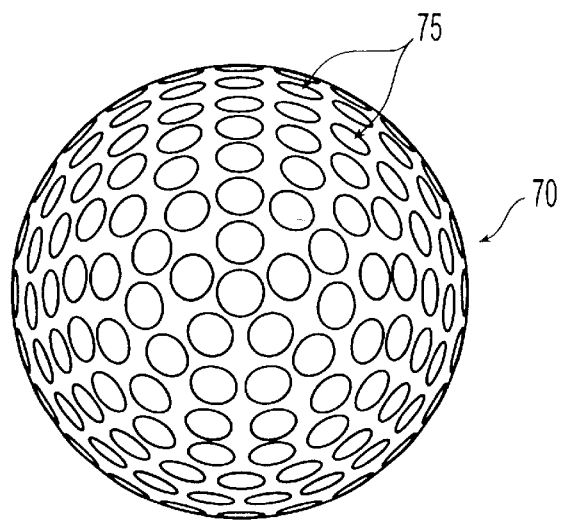
FIG. 4 is a perspective view of a two-piece golf ball formed using a mold-half of the present invention.
Figure 5:
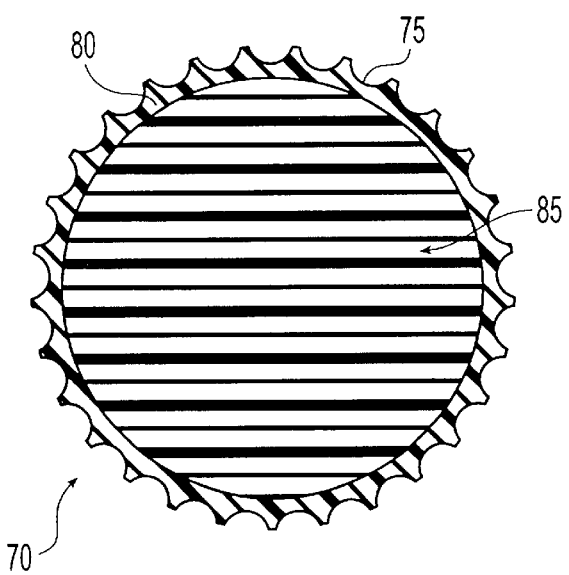
FIG. 5 is a cross-sectional view of the golf ball of FIG. 4.

Referring to FIGS. 4 and 5, two-piece golf ball 70 formed using a mold-half of the present invention, includes dimples 75 on the surface thereof. The golf ball 70 is made by molding a cover 80 with dimples 75 about a solid core 85.

Figure 6:
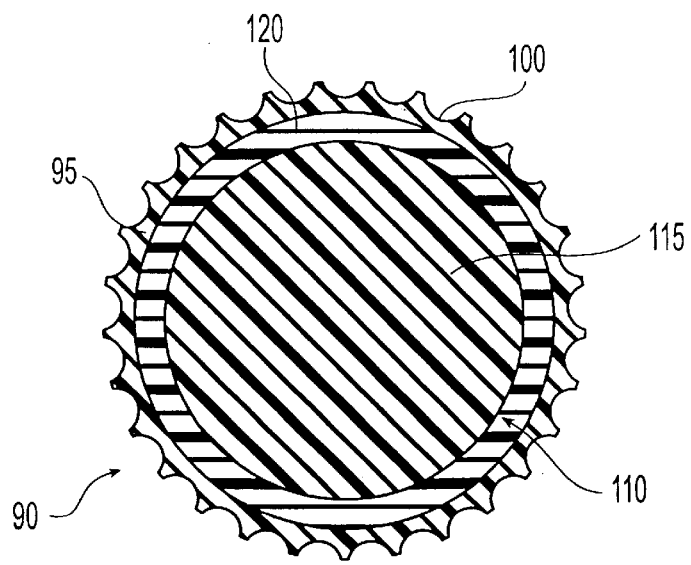
FIG. 6 is a cross-sectional view of a three-piece golf ball formed using the mold-half of the present invention.

Referring to FIG. 6, three-piece ball golf ball 90 may be made by molding a cover 95 with dimples 100 around a solid core 110 comprising a center 115 with a mantle layer 120 molded about the outside of the center 115.

Figure 7:
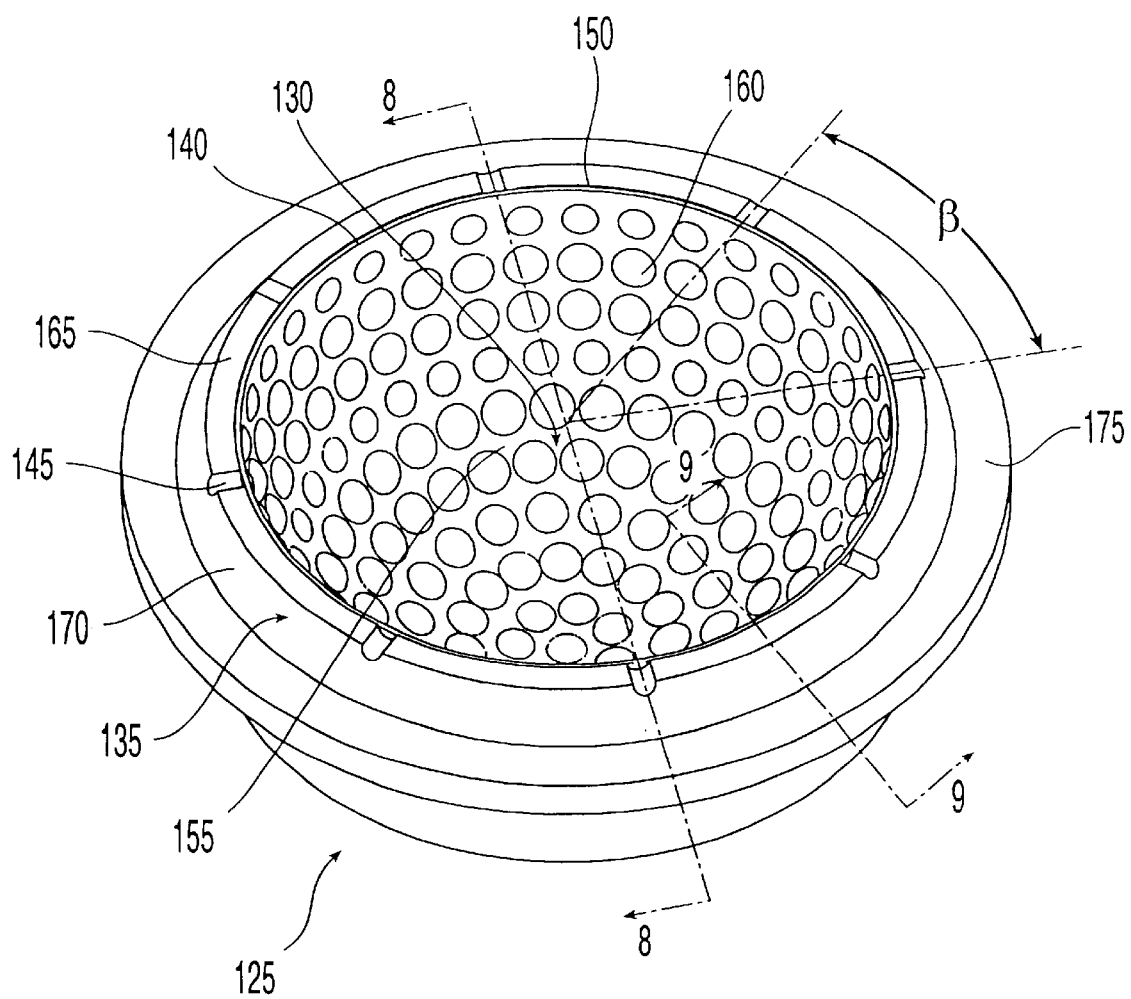
FIG. 7 is a perspective view of the mold-half of the present invention.
Figure 8:
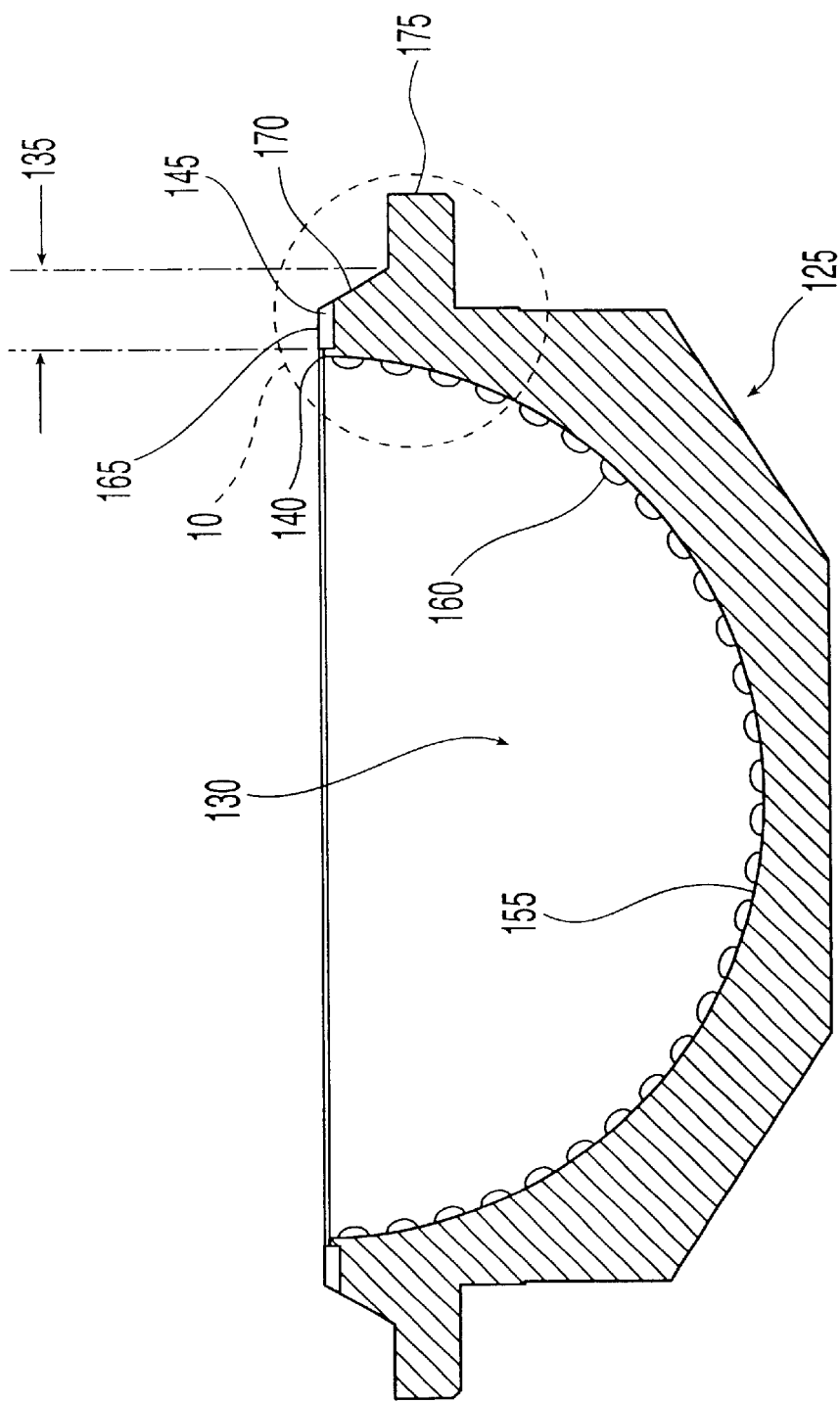
FIG. 8 is an enlarged, cross-sectional view along line 8—8 of the mold-half in FIG. 7, only selected dimple forming projections are shown.
Figure 9:
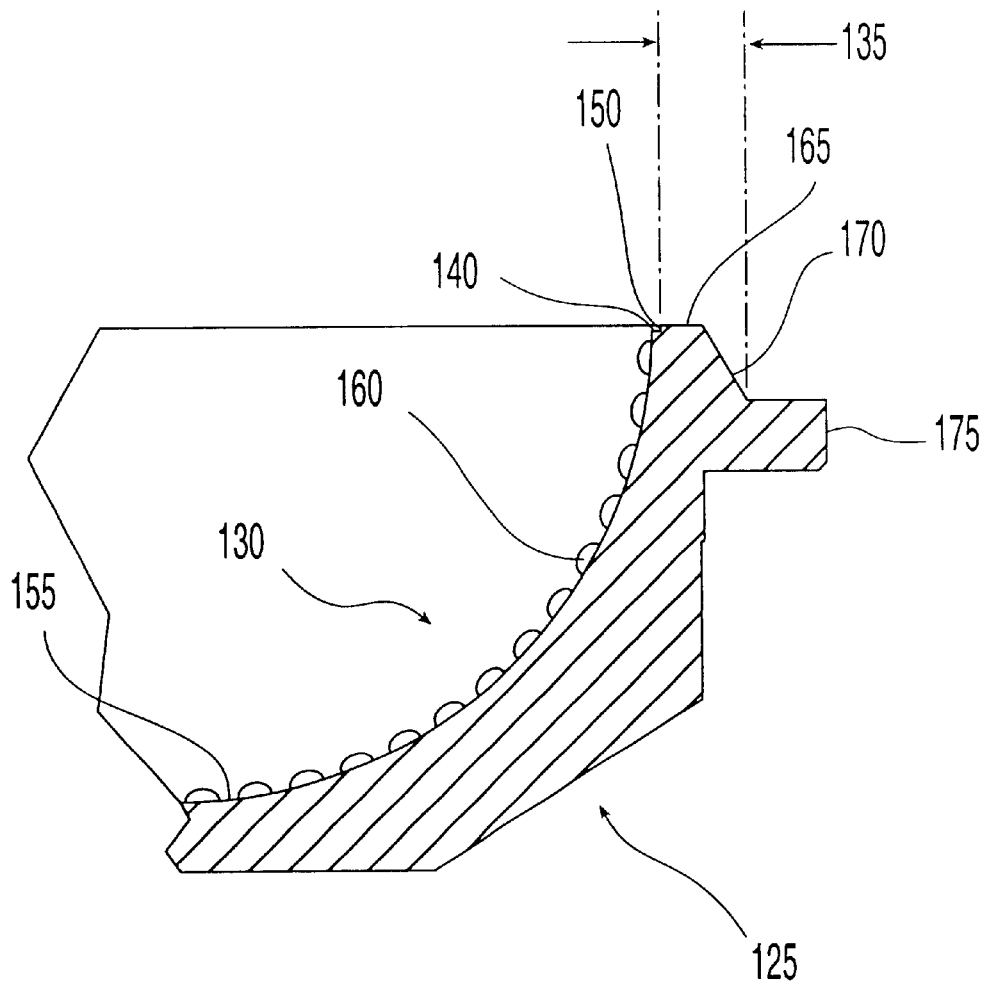
FIG. 9 is an enlarged, partial-sectional view along line 9—9 of the mold-half in FIG. 7, only selected dimple forming projections are shown.

Referring to FIGS. 7–9, the mold-half 125 of the present invention comprises a cavity 130, a land area 135 surrounding the cavity 130, a recessed circumferential ledge 140 adjacent the cavity 130, and a plurality of vents 145 spaced from the cavity 130. Other than the vents the upper surface of the land area is continuous and uninterrupted. The recessed circumferential ledge 140 also defines a wall 150 (best seen in FIG. 9) which extends vertically and circumferentially between the vents 145. Generally, cavity 130 is hemispherical in shape and is centered within the mold-half 125. The hemispherical cavity 130 is placed and configured within mold-half to allow the cavities of a pair of mold-halves 125 to form an unobstructed spherical cavity when joined together.

The land area 135 is dimensioned and configured to facilitate mating the mold-halves by providing a structurally stable contact area between the mold-halves. Additionally, the mold-half 125 is further configured to form a circumferential ledge 140 and wall 150 adjacent the cavity 130. The land area 135 further includes a plurality of vents 145 comprising radially extending channels within the upper surface of the land area 165. The operative dimensions and configuration of these features allow the cavity 130, circumferential ledge 140, wall 150, and vents 145 to cooperate and form a system for controlling the release of excess material from the mold cavity 130.

Referring again to FIG. 7, a surface 155 of the cavity 130 is textured with dimple forming projections 160, which produce a dimple pattern on the golf ball. The vents 145 are isolated or spaced from each other within the upper surface 165 of the land area 135. The angle β represents the spacing of vents 145 around the land area 135. The land area 135 further includes a sloped surface 170 which is situated above a mold-half projection 175. Referring to FIGS. 8 and 9, the spatial relationship between the upper surface 165 of the land area, a vent sidewall 145, the sloped portion of the land area 170 and the mold-half projection 175 are best seen.

Figure 10:
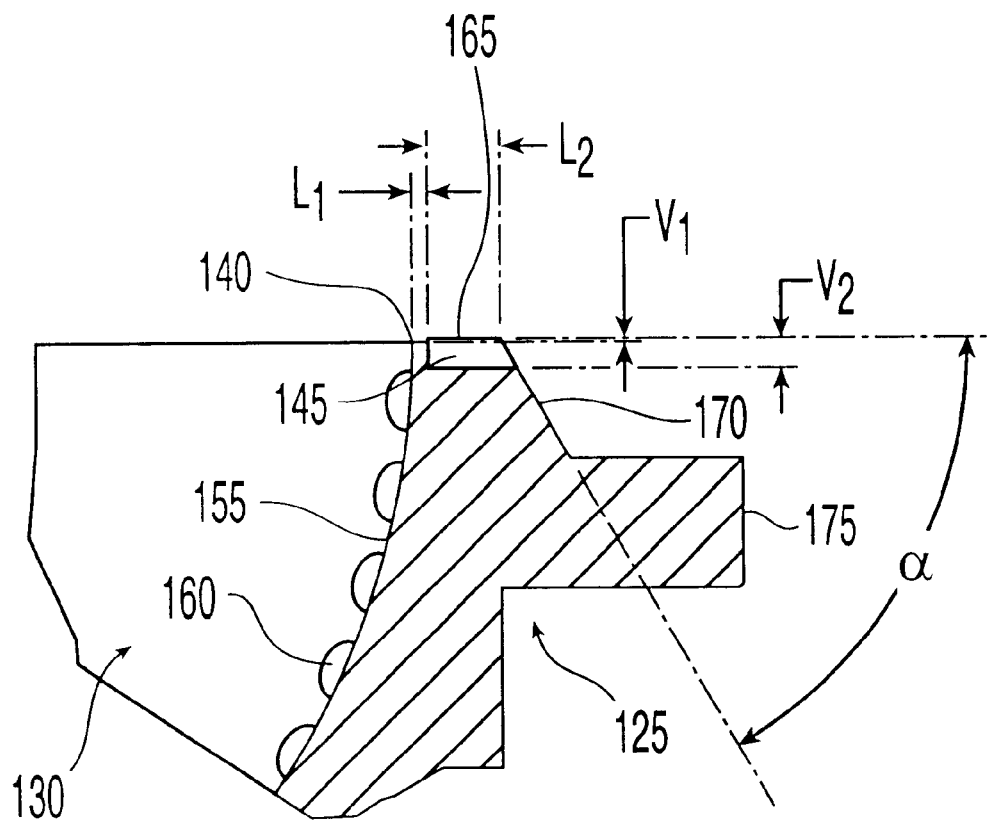
FIG. 10 is an enlarged partial-sectional view within circle 10 in FIG. 8, only selected dimple forming projections are shown.

Referring to FIG. 10, an enlarged view of the mold-half 125 shows vertical dimensions $V_1$ and $V_2$, horizontal dimensions $L_1$ and $L_2$, and angle α. Dimension $V_1$ represents the distance from the upper surface 165 of the land area to the recessed circumferential ledge 140. Dimension $L_1$ represents the length of the ledge 140. Dimension $V_2$ represents the distance from the upper surface 165 of the land area to the bottom of each vent 145. Dimension $L_2$ represents the shortest length of each vent 145. Angle a represents the declination of the sloped portion 170 of the land area as measured from the horizontal plane containing the upper surface 165 of the land area.

During use, two mold-halves 125 are joined together so that the hemispherical cavity 130 of each mold-half combines to form a single spherical cavity for molding a mantle layer or cover around a golf ball subassembly. Prior to assembly of the mold-halves, material is placed within each hemispherical cavity 130 of the mold-half pair. Next, the golf ball center 85 or 115 or core 110 (as shown in FIGS. 5 and 6) is inserted into the cavity 130 of one mold-half 125. Then, the mold-halves are joined together so that the material is molded around the golf ball center 85, 115 or core 110.

During molding, with reference to FIGS. 7 and 10, excess material from the spherical cavity is squeezed through the very thin and narrow annular space or chamber formed by the ledges 140 adjacent the mold-half cavity 130. The excess material is contacts the vertical wall 150 and moves out of the mold-half via vents 145 located around the circumference of the mold in fluid communication with the chamber created by the ledges. The annular space formed by the recessed circumferential ledges 140 of each mold-half, and the adjacent mold-half vents 145 allow the excess material to escape the cavity 130 in a controlled fashion while preventing significant amounts of unwanted material from solidifying on or near the golf ball.

During molding a piece of excess material forms between the golf ball and the vented excess material. The physical dimensions of the piece of excess material are designed and configured to allow its separation from the golf ball without damaging the golf ball cover. According to the preferred embodiment of the present invention, the piece of excess material forms within the annular space created by the recessed ledges 140. As shown in FIG. 10, each ledge 140 has a horizontal dimension $L_1$ which is substantially greater than its vertical dimension $V_1$. Most preferably, these dimensions are about 0.015 inches and about 0.005 inches, respectively. Additionally, the ratio between the length $L_1$ of the circumferential ledge 140 and the length of each vent channel $L_2$ is preferably between about 0.1 and about 0.5, and most preferably about 0.2. Preferably, however, the length of the ledge $L_1$ should not exceed half the length $L_1+L_2$ of the upper surface 165 of the land area. Thus, in the preferred embodiment of the invention the length of the ledge $L_1$ is less than about 50% of the length $L_1+L_2$ of the upper surface 165 of the land area.

Further, the vents are sized to provide sufficient volume to transport the excess material out of the mold-half cavity in a controlled manner. As shown in FIG. 7 at least six vents abut the annular space and transport the excess material to the sloped portion 170 of the land area. The vents 145, preferably, are geometrically identical and are distributed uniformly around the circumference of the land area. In this embodiment, the angle β between vents is about 45 degrees. Referring to FIG. 10, the depth $V_2$ of each vent channel measured from the top of the upper surface 165 of the land area is about 0.03 inches. Also, the ratio between the depth $V_1$ of the circumferential ledge 140 and the depth of each vent 145 $V_2$ is between about 0.1 and 0.2 in this embodiment. The mold-half 125 of the present invention is preferably formed from steel or silicon bronze and coated with mold release to further aid in removing the golf ball from the mold. The invention, however, is not limited to these materials. Thus, the mold-half 125 of this configuration allows a uniform and indirect path for the excess material to exit the mold-half cavity 135 and minimizes mold-half 125 separation.

While the above invention has been described with reference to certain preferred embodiments, it should be kept in mind that the scope of the present invention is not limited to these embodiments. The mold-half 125 can be modified to accommodate particular formulations of material which may require modification of the dimensions of the recessed circumferential ledge 140 and vents 145. Similarly, the number and spacing of the vents 145 may be changed. Also, mold-halves 125 without dimple forming projections 160 may be produced for forming a smooth mantle layer 120 around a golf ball center 115. And, different surface coatings may be applied to the mold-halves 125 to better facilitate demolding.

The embodiments above can also be modified so that some features of one embodiment are used with the features of another embodiment. One skilled in the art may find variations of these preferred embodiments which, nevertheless, fall within the spirit of the present invention, whose scope is defined by the claims set forth below.

What is claimed:

1. A mold-half for forming a golf ball layer of a material comprising:
    a cavity;
    a land area surrounding the cavity, the land area having an upper surface and at least one vent defined in the upper surface spaced from the cavity; and
    a circumferential ledge adjacent the cavity and each vent, wherein the circumferential ledge is recessed from the upper surface of the land area.

2. The mold-half of claim 1, wherein each vent extends to the ledge.

3. The mold-half of claim 1, wherein the length of the circumferential ledge is between about 0.005 inches and about 0.05 inches.

4. The mold-half of claim 1, wherein the length of the circumferential ledge is about 0.015 inches.

5. The mold-half of claim 1, wherein the circumferential ledge is recessed from the upper surface of the land area by about 0.001 to about 0.01 inches.

6. The mold-half of claim 1, wherein the circumferential ledge is recessed from the upper surface of the land area by about 0.005 inches.

7. The mold-half of claim 5, wherein each vent is spaced between about 0.005 inches and about 0.05 inches from the cavity.

8. The mold-half of claim 5, wherein the width of a portion of the land area separating the ledge from each vent is about 0.015 inches.

9. The mold-half of claim 1, wherein the depth of each vent is between about 0025 inches and about 0.08 inches.

10. The mold-half of claim 1, wherein the depth of each vent is about 0.03 inches.

11. The mold-half of claim 1, wherein the length of each vent is at least between about 0.04 inches and about 0.080 inches.

12. The mold-half of claim 1, wherein the length of each vent is at least about 0.05 inches.

13. The mold-half of claim 1, further including a projection extending radially outward along the entire circumference of the land area and the upper surface of the projection is located below the upper surface of the land area.

14. The mold-half of claim 1, wherein the cavity includes a plurality of projections for forming a plurality of depressions in the layer.

15. The mold-half of claim 1, wherein the land area contains a plurality of vents.

16. The mold-half of claim 15, wherein the vents are uniformly spaced around the circumference of the land area.

17. The mold-half of claim 1, wherein the mold-half is configured with dimples to form a cover layer.

18. A mold-half for forming a golf ball layer of a material comprising:
    a cavity;
    a land area surrounding the cavity having at least six vents radially disposed therein and spaced from the cavity, wherein the land area is interrupted only by the vents; and
    a circumferential ledge adjacent the cavity and each vent, and the length of the ledge is substantially narrower than the length of the upper surface of the land area.

19. The mold-half of claim 18, wherein the ratio between the width of the circumferential ledge and the length of each vent channel is between about 0.1 and about 0.5.

20. The mold-half of claim 18, wherein the length of the ledge is less than about 50% of the length of the upper surface of the land area.

21. The mold-half of claim 18, wherein the ratio between the depth of the ledge and the depth of each vent is between about 0.1 and about 0.2.

22. A mold for forming a layer of material around a golf ball subassembly comprising a pair of mold-halves, each mold-half comprising:
    a hemispherical cavity;
    a land area surrounding the cavity having an upper surface and at least one vent defined in the upper surface spaced from the cavity; and
    a recessed circumferential ledge adjacent the cavity and each vent.

23. The mold of claim 22, wherein each ledge is recessed from each land area, and upon joining the land areas of the mold-halves a spherical cavity is formed by the hemispherical cavities for receiving the subassembly, a chamber is formed adjacent the cavity by the ledges and each vent forms a bore such that flow of the material from the chamber is allowed primarily through the bores.

24. The mold of claim 23, wherein the volume of the chamber is sufficient to contain the material during flow from the cavity without allowing the mold-halves to separate.

25. A mold for forming a layer of material around a golf ball subassembly comprising: a pair of mold-halves, each mold-half comprising:

a hemispherical cavity;

a land area surrounding the cavity having an upper surface and at least one vent disposed therein, wherein the land area is interrupted only by the at least one vent; and a circumferential ledge adjacent the cavity, wherein the upper surface of one land area is configured to mate with the opposing land area of the pair.

* * * * *